United States Patent
Abbaszadeh et al.

(10) Patent No.: US 10,805,329 B2
(45) Date of Patent: *Oct. 13, 2020

(54) AUTONOMOUS RECONFIGURABLE VIRTUAL SENSING SYSTEM FOR CYBER-ATTACK NEUTRALIZATION

(71) Applicant: General Electric Company, Schenectady, NY (US)

(72) Inventors: Masoud Abbaszadeh, Clifton Park, NY (US); Lalit Keshav Mestha, North Colonie, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/977,595

(22) Filed: May 11, 2018

(65) Prior Publication Data

US 2019/0230106 A1    Jul. 25, 2019

Related U.S. Application Data

(60) Provisional application No. 62/619,359, filed on Jan. 19, 2018.

(51) Int. Cl.
*H04L 29/06* (2006.01)
*G05B 23/02* (2006.01)
(Continued)

(52) U.S. Cl.
CPC ...... *H04L 63/1425* (2013.01); *G05B 23/0229* (2013.01); *G05B 23/0297* (2013.01);
(Continued)

(58) Field of Classification Search
CPC ..... H04L 63/14; H04L 63/1425; H04L 41/06; H04L 63/1416; H04L 63/1441;
(Continued)

(56) References Cited

U.S. PATENT DOCUMENTS 10,372,569 B2 * 8/2019 Premerlani ............. H04L 67/12
10,505,955 B2 * 12/2019 Mestha ............... H04L 63/1425
(Continued)

FOREIGN PATENT DOCUMENTS

EP    3206368 A1    8/2017
EP    3239884 A1    11/2017
(Continued)

OTHER PUBLICATIONS

Philip et al., "Learning Rules and Clusters for Anomaly Detection in Network Traffic", Managing Cyber Threats, https://link.springer.com/chapter/10.1007/0-387-24230-9_3, vol. 05, pp. 81-99, 19 pp.
(Continued)

*Primary Examiner* — Malcolm Cribbs
(74) *Attorney, Agent, or Firm* — Buckley, Maschoff & Talwalkar LLC

(57) ABSTRACT

An industrial asset may be associated with a plurality of monitoring nodes, each monitoring node generating a series of monitoring node values over time representing current operation of the industrial asset. An abnormality detection computer may determine that at least one abnormal monitoring node is currently being attacked or experiencing a fault. A virtual sensing estimator may continuously execute an adaptive learning process to create or update virtual sensor models for the monitoring nodes. Responsive to an indication that a monitoring node is currently being attacked or experiencing a fault, the virtual sensing estimator may be dynamically reconfigured to estimate a series of virtual node values for the abnormal monitoring node or nodes based on information from normal monitoring nodes and appropriate virtual sensor models. The series of monitoring node values from the abnormal monitoring node or nodes may then be replaced with the virtual node values.

20 Claims, 15 Drawing Sheets

(51) Int. Cl.
*H04L 12/24* (2006.01)
*G05B 19/042* (2006.01)
*H04L 29/08* (2006.01)

(52) U.S. Cl.
CPC .......... *H04L 41/06* (2013.01); *H04L 63/1416* (2013.01); *H04L 63/1441* (2013.01); *H04L 63/1466* (2013.01); *G05B 19/0428* (2013.01); *H04L 63/1408* (2013.01); *H04L 67/12* (2013.01)

(58) Field of Classification Search
CPC . H04L 63/1466; H04L 63/1408; H04L 67/12; G05B 23/0229; G05B 23/0297; G05B 19/0428
See application file for complete search history.

(56) References Cited

U.S. PATENT DOCUMENTS

| | | | | |
|---|---|---|---|---|
| 2004/0153804 | A1* | 8/2004 | Blevins | G05B 15/02 714/33 |
| 2007/0005266 | A1* | 1/2007 | Blevins | G05B 17/02 702/22 |
| 2007/0129917 | A1* | 6/2007 | Blevins | G05B 19/0428 703/6 |
| 2007/0168065 | A1* | 7/2007 | Nixon | G06Q 50/04 700/83 |
| 2010/0319069 | A1 | 12/2010 | Granstedt et al. | |
| 2011/0178611 | A1* | 7/2011 | Daraiseh | G05B 19/0428 700/80 |
| 2012/0047103 | A1* | 2/2012 | Marecki | G06Q 10/10 706/52 |
| 2012/0284790 | A1 | 11/2012 | Bhargava | |
| 2013/0132149 | A1 | 5/2013 | Wei et al. | |
| 2014/0157405 | A1* | 6/2014 | Joll | H04L 63/1425 726/22 |
| 2014/0301276 | A1* | 10/2014 | Carlsson | H04L 67/12 370/328 |
| 2016/0209838 | A1* | 7/2016 | Uchida | G07C 5/008 |
| 2016/0344760 | A1 | 11/2016 | Sarkesain | |
| 2017/0006135 | A1* | 1/2017 | Siebel | G06F 8/10 |
| 2017/0304707 | A1 | 10/2017 | Morton et al. | |
| 2017/0359366 | A1 | 12/2017 | Bushey et al. | |
| 2018/0196942 | A1* | 7/2018 | Kashyap | G06F 21/56 |
| 2018/0262519 | A1* | 9/2018 | Arunkumar | G06F 16/258 |
| 2018/0276842 | A1* | 9/2018 | Seaman | G05B 23/0297 |

FOREIGN PATENT DOCUMENTS

| | | |
|---|---|---|
| WO | 2016172514 A1 | 10/2016 |
| WO | 20170171639 A1 | 10/2017 |

OTHER PUBLICATIONS

Siddharth et al., "Model-Based Attack Detection and Mitigation for Automatic Generation Control", IEEE Transactions on Smart Grid, http://ieexplore.ieee.org/abstract/document/6740883/, vol. 5, Issue 2, pp. 580-591, Mar. 2014, 12 pp.

Paridari et al., "A Framework for Attack-Resilient Industrial Control Systems: Attack Detection and Controller Reconfiguration", Institute of Electrical and Electronics Engineers, http://kth.diva-portal.org/smash/record.jsf?pid=diva2%3A1138642&dswid=5985, vol. 106, Issue 01, pp. 113-128, 2017. 16 pp.

"Communication—European Search Report", EP Application No. 18204056.8, dated Apr. 18, 2019, 8 pp.

* cited by examiner

VIRTUAL SENSOR LOOKUP TABLE 900

| VIRTUAL SENSOR MATRIX 910 | SIGNAL BEING ESTIMATED 920 |
|---|---|
| $C_{1,1}$ | DWATT |
| $C_{2,1}$ | TTXM |
| $C_{3,1}$ | CTD |
| $C_{4,1}$ | FQG |
| $C_{5,1}$ | CPD |
| $C_{6,1}$ | CTIM |
| $C_{1,2}$ | DWATT, TTXM |
| .... | .... |
| $C_{15,2}$ | CPD, CTD |

*FIG. 9*

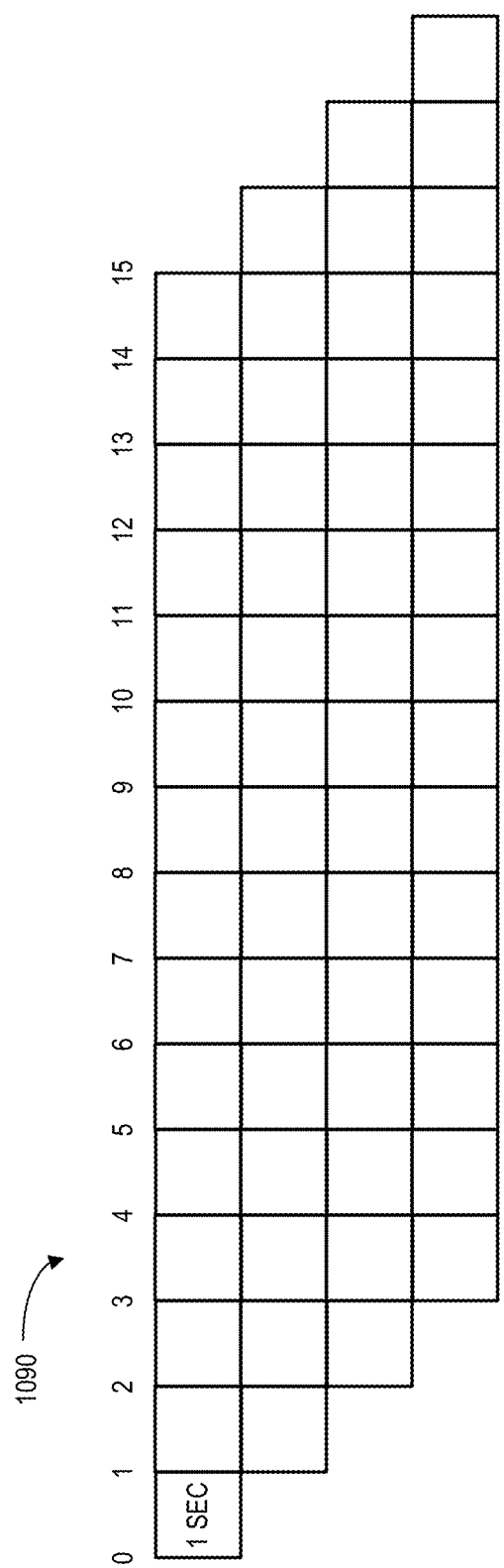

| INDUSTRIAL ASSET IDENTIFIER 1202 | INDUSTRIAL ASSET DESCRIPTION 1204 | VIRTUAL SENSOR IDENTIFIER 1206 | MATRIX 1208 | DESCRIPTION 1210 | STATUS 1212 |
|---|---|---|---|---|---|
| IA_2001 | GAS TURBINE | VS_01 | C1,1 | DWATT | NORMAL |
| IA_2001 | GAS TURBINE | VS_02 | C2,1 | TTXM | ATTACKED |
| IA_2001 | GAS TURBINE | VS_03 | C5,1 | CPD | PREDICTED |
| IA_2002 | ELECTRIC POWER GRID | VS_04 | C1,2 | DWATT, TTXM | NORMAL |

FIG. 12

AUTONOMOUS RECONFIGURABLE VIRTUAL SENSING SYSTEM FOR CYBER-ATTACK NEUTRALIZATION

CROSS-REFERENCE TO RELATED APPLICATIONS

The present application claims the benefit of U.S. Provisional Patent Application No. 62/619,359 entitled "AUTONOMOUS RECONFIGURABLE VIRTUAL SENSING SYSTEM FOR CYBER-ATTACK NEUTRALIZATION" and filed Jan. 19, 2018. The entire content of that application is incorporated herein by reference.

This invention was made with Government support under contract number DE-OE0000833 awarded by the Department of Energy. The Government has certain right in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). Existing approaches to protect an industrial control system, such as failure and diagnostics technologies, may not adequately address these problems—especially when multiple, simultaneous attacks occur since such multiple faults/failure diagnostic technologies are not designed for detecting stealthy attacks in an automatic manner.

It may be important to maintain an industrial asset's functionality during an attack. For example, an operator may want a power generation plant to continue to provide electricity even when one or more sensors, actuators, etc. are the subject of a cyber-attack. It may similarly be desired to operate the asset when one or more monitoring nodes fail. Moreover, it may be advantageous to provide protection for an industrial asset without requiring redundant components (e.g., industrial control systems) and/or any major changes and/or re-design of controllers.

SUMMARY

According to some embodiments, an industrial asset may be associated with a plurality of monitoring nodes, each monitoring node generating a series of monitoring node values over time that represent operation of the industrial asset. An abnormality detection computer may determine that at least one abnormal monitoring node is currently being attacked or experiencing a fault. A virtual sensing estimator may continuously execute an adaptive learning process to create or update virtual sensor models for the monitoring nodes. Responsive to an indication that a monitoring node is currently being attacked or experiencing a fault, the virtual sensing estimator may be dynamically reconfigured to estimate a series of virtual node values for the abnormal monitoring node or nodes based on information from normal monitoring nodes and appropriate virtual sensor models. The series of monitoring node values from the abnormal monitoring node or nodes may then be replaced with the virtual node values.

Some embodiments comprise: means for determining, by an abnormality detection computer, that at least one abnormal monitoring node is currently being attacked or experiencing a fault; means for continuously executing, by a virtual sensing estimator, an adaptive learning process to create or update virtual sensor models for the monitoring nodes; responsive to an indication that at least one abnormal monitoring node is currently being attacked or experiencing a fault, means for dynamically reconfiguring the virtual sensing estimator to estimate a series of virtual node values for the abnormal monitoring node or nodes based on information from normal monitoring nodes and appropriate virtual sensor models; and means for replacing the series of monitoring node values from the abnormal monitoring node or nodes with the virtual node values.

Some technical advantages of some embodiments disclosed herein are improved systems and methods to protect an industrial asset from cyber-attacks in an automatic and accurate manner.

BRIEF DESCRIPTION OF THE DRAWINGS

FIG. 9 includes a portion of a virtual sensor lookup table according to some embodiments.

FIG. 10B illustrates a sliding window technique for real-time measurements in accordance with some embodiments.

FIG. 12 is a tabular portion of a virtual sensor database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
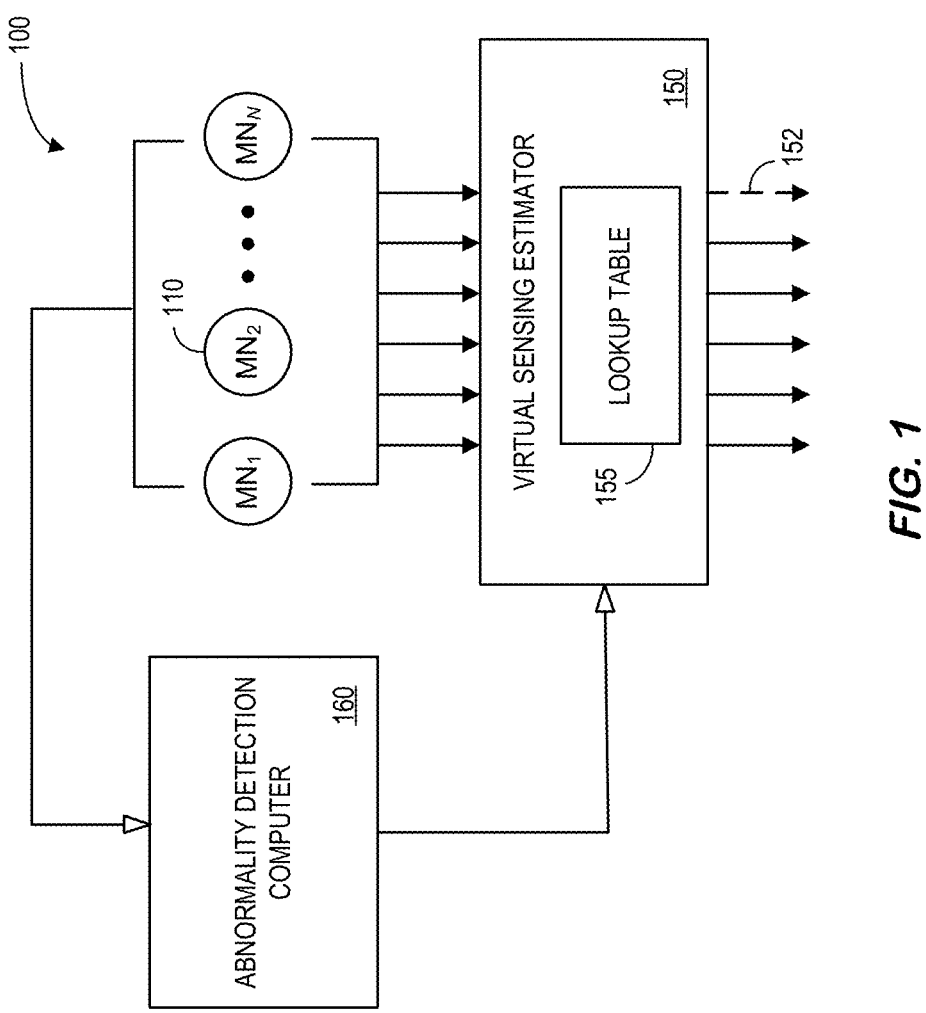
FIG. 1 is a high-level block diagram of a system to protect an industrial asset according to some embodiments.

Industrial control systems that operate physical systems are increasingly connected to the Internet. Note that, as used herein, the term "industrial" might be associated with any system that is connected to an external source, such as the Internet in the case of a cyber-physical system or locally operating an air-gapped physical system. As a result, these control systems have been increasingly vulnerable to threats and, in some cases, multiple attacks may occur simultaneously. Protecting an asset may depend on detecting such attacks as well as naturally occurring faults and failures. Existing approaches to protect an industrial control system, such as failure and diagnostics technologies, may not adequately address these threats—especially when multiple, simultaneous attacks occur. It would therefore be desirable to protect an industrial asset from cyber threats in an automatic and accurate manner. In particular, an operator of an industrial asset might want to implement "accommodation" procedures such that critical functions of the asset may automatically still function even in the event of one or more cyber-attacks or monitoring node failure (e.g., by replacing unhealthy sensor node data values with virtual sensor data values based on information obtained from other, healthy nodes). FIG. 1 is a high-level architecture of a system 100 that might be used to protect an industrial asset such as a gas turbine. The system 100 may include a plurality of monitoring nodes 110, each monitoring node generating a series of monitoring node values over time that represent operation of the industrial asset (e.g., a temperature, a speed, a voltage, etc.). An abnormality detection computer 160 coupled to the monitoring nodes 110 may be adapted to determine that a particular monitoring node is currently being attacked by a cyber-threat or is experiencing a failure (e.g., a sensor might be stuck). A virtual sensing estimator 150 may receive an indication of the abnormal monitoring node and, as a result, estimate a series of virtual node values for the attacked monitoring node based on information received from monitoring nodes that not currently being attacked (e.g., using a lookup table 155). In some embodiments, an estimation of series of virtual node values happens in real-time during normal operation as opposed to estimating the virtual node values after the abnormal monitoring node information is received. Soon after the abnormal monitoring node information is received, signals from abnormal monitoring nodes are replaced by the most current virtual node values. The virtual sensor may then replace the series of monitoring node values from the attacked monitoring node with the virtual node values (e.g., as illustrated by the dashed arrow output 152 in FIG. 1).

Figure 2:
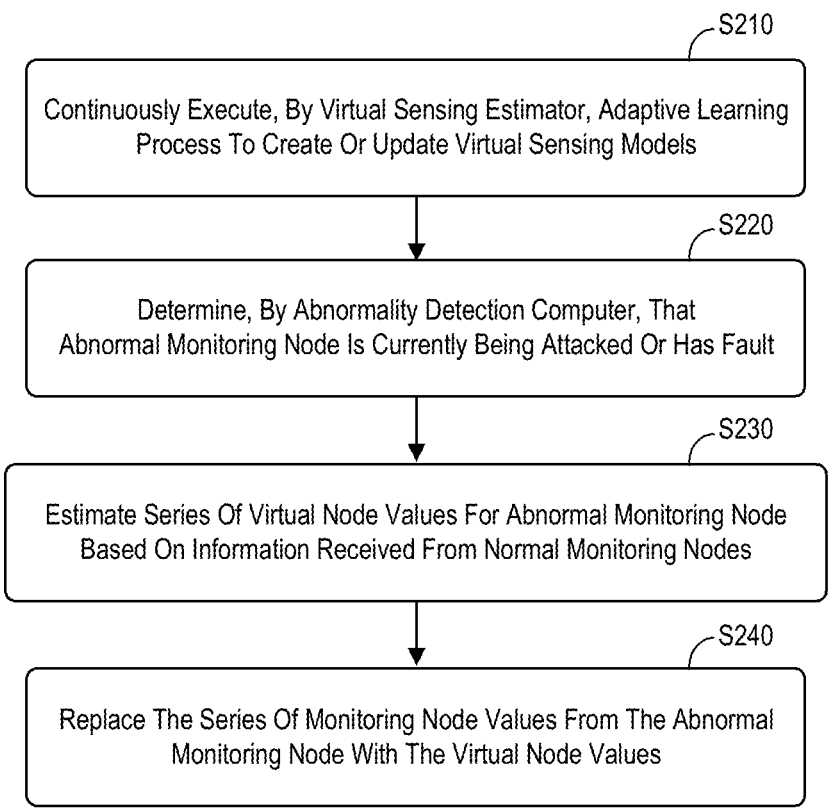
FIG. 2 is an industrial asset protection method in accordance with some embodiments.

FIG. 2 is an industrial asset protection method that might be associated with the elements of the system of FIG. 1. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, they system may continuously execute (e.g., on-line as the industrial asset operates) an adaptive learning process to create (when no pre-determined model is available) or update (when a pre-determined model was created off-line) virtual sensing models in accordance with any of the embodiments described herein. The adaptive learning process might be associated with, for example, a reinforcement learning network.

At S220, an abnormality detection computer might determine that one or more monitoring nodes is currently abnormal (e.g., the node being attacked and/or is experiencing a failure). Examples of systems and processes that might be used to make such a determination are described herein, for example, with respect to FIGS. 3 through 7. At S230, a virtual sensor may estimate a series of virtual node values for the abnormal monitoring node based on information received from monitoring nodes that are currently normal. That is, information from "healthy" monitoring nodes may be used to estimate data from a monitoring node that is behaving abnormally. Note that the estimations associated with S230 might be performed even before a determination is made that a particular node is currently being attacked (e.g., at S220). At S240, the series of monitoring node values from the attacked monitoring node may be replaced with the virtual node values. As a result, the industrial asset may continue to operate even when undergoing a cyber-attack or monitoring node failure. According to some embodiments, the series of virtual node values are estimated directly in time space (e.g., after pre-filtering as described herein).

Figure 3:
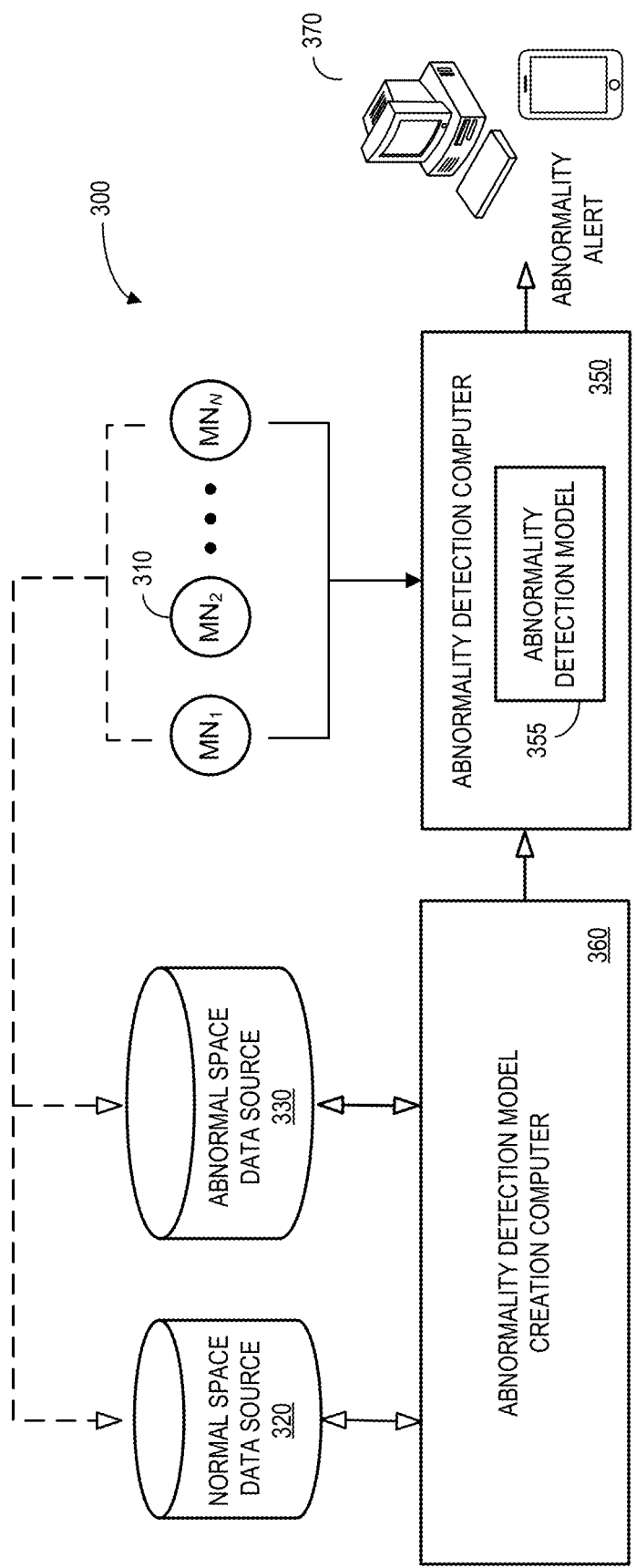
FIG. 3 is a block diagram of an industrial asset protection system according to some embodiment.

Note that a determination that a particular monitoring node is currently abnormal might be based on an abnormality detection model created for the industrial asset. For example, FIG. 3 is an example of an industrial asset protection system 300. The system 300 may include a "normal space" data source 320 storing, for each of a plurality of monitoring nodes 310, a series of normal values over time that represent normal operation of an industrial asset (e.g., collected from actual monitoring node 310 data as illustrated by the dashed line in FIG. 3). The system 300 may also include an "abnormal space" data source 330 storing series of values over time associated with monitoring nodes undergoing a cyber-attack (e.g., as recorded during an actual attack or as predicted by a high-fidelity physics-based industrial asset model) and/or experiencing a failure.

Information from the normal space data source 320 and the abnormal space data source 330 may be provided to an abnormality detection model creation computer 360 that uses this data to create a decision boundary (that is, a boundary that separates normal behavior from abnormal behavior). The decision boundary may then be used by an abnormality detection computer 350 executing an abnormality detection model 355. The abnormality detection model 355 may, for example, monitor streams of data from the monitoring nodes 310 comprising data from sensor nodes, actuator nodes, and/or any other critical monitoring nodes (e.g., monitoring nodes $MN_1$ through $MN_N$) and automatically output an abnormality alert (e.g., indicating that various monitoring nodes of the industrial asset are normal, attacked, or experiencing a fault) to one or more remote monitoring devices 370 when appropriate (e.g., for display to a user) and/or to a virtual sensing estimator. As used herein, the terms "automatically" or "autonomous" may refer to, for example, actions that can be performed with little or no human intervention. According to some embodiments, information about a detected abnormality may also be transmitted back to an industrial control system.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormality detection model creation computer 360 may store information into and/or retrieve information from various data stores, such as the normal space data source 320 and the abnormal space data source 330. The various data sources may be locally stored or reside remote from the abnormality detection model creation computer 360. Although an abnormality threat detection model creation computer 360 is shown in FIG. 3, any number of such devices may be included. Moreover, various devices described herein might be combined according to embodiments of the present invention. For example, in some embodiments, the abnormality detection model creation computer 360, normal space data source 320, and abnormal space data source 330 might comprise a single apparatus. The abnormality detection model creation computer 360 and/or abnormality detection computer 350 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to view information about and/or manage attack and fault information in accordance with any of the embodiments described herein. In some cases, an interactive graphical display interface may let a user define and/or adjust certain parameters (e.g., attack detection trigger levels or model configurations) and/or provide or receive automatically generated recommendations or results from the abnormality detection model creation computer 360 and/or the abnormality detection computer 350.

Figure 4:
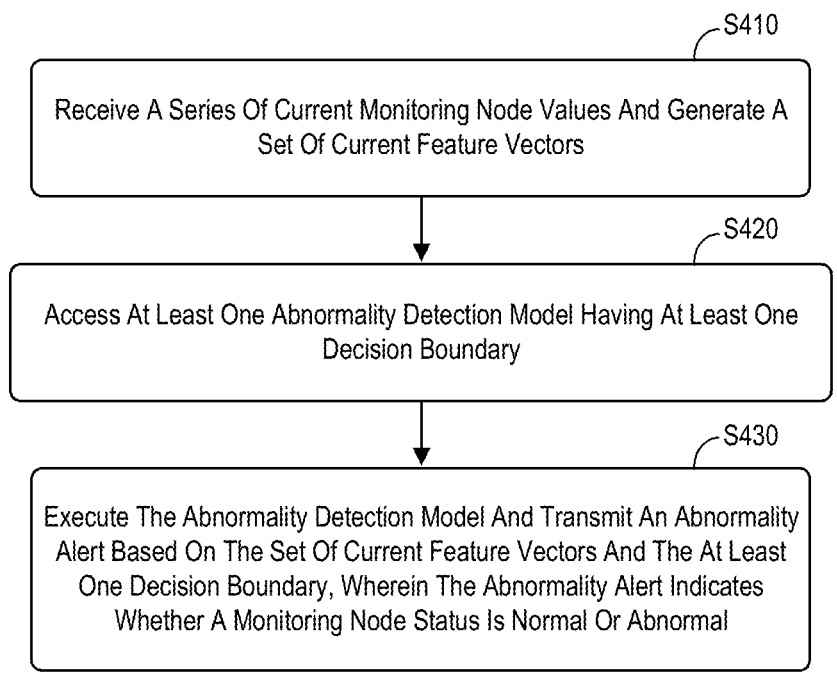
FIG. 4 illustrates a method of generating an abnormality alert in accordance with some embodiments.

The decision boundary associated with the abnormality detection model 355 can be used to detect cyber-attacks. For example, FIG. 4 is an industrial asset protection method that might be implemented according to some embodiments. At S410, the system may receive, from a plurality of monitoring nodes, a series of current values over time that represent a current operation of an industrial asset. The system may also generate, based on the received series of current values, a set of current feature vectors. At S420, an abnormality detection model may be accessed including at least one decision boundary. At S430, the model may be executed and an abnormality alert may be transmitted (e.g., to a virtual sensing estimator) based on the set of current feature vectors and the decision boundary when appropriate (e.g., when a cyber-attack or fault is detected). According to some embodiments, one or more response actions may be performed when an abnormality alert is transmitted. For example, the system might automatically shut down all or a portion of the industrial asset (e.g., to let the detected potential cyber-attack or fault be further investigated). As other examples, one or more parameters might be automatically modified, a software application might be automatically triggered to capture data and/or isolate possible causes, a virtual sensor might be created or deployed, etc.

When available, a system may take advantage of the physics of an industrial asset by learning a priori from tuned high fidelity equipment models and/or actual "on the job" data to detect single or multiple simultaneous adversarial threats to or faults in the system. Moreover, monitoring node data may be converted to features using advanced feature-based methods, and the real-time operation of the control system may be monitoring in substantially real-time. Abnormalities may be detected by classifying the monitored data as being "normal" or "abnormal" (e.g., "attacked"). This decision boundary may be constructed in feature space using dynamic models and may help enable early detection of vulnerabilities (and potentially avert catastrophic failures) allowing an operator to restore the control system to normal operation in a timely fashion. Note, however, that in many cases a physics-based model of an industrial asset might not be readily available.

Figure 5:
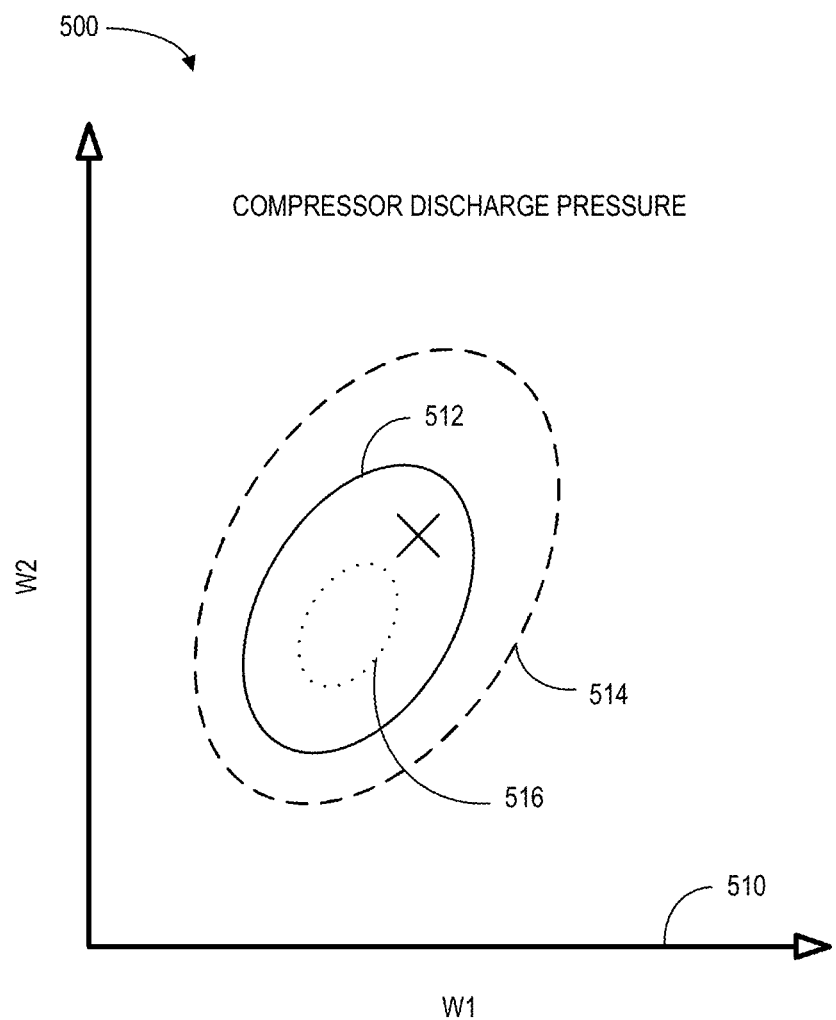
FIGS. 5 and 6 illustrate features, feature vectors, and decision boundaries in accordance with some embodiments.
Figure 6:
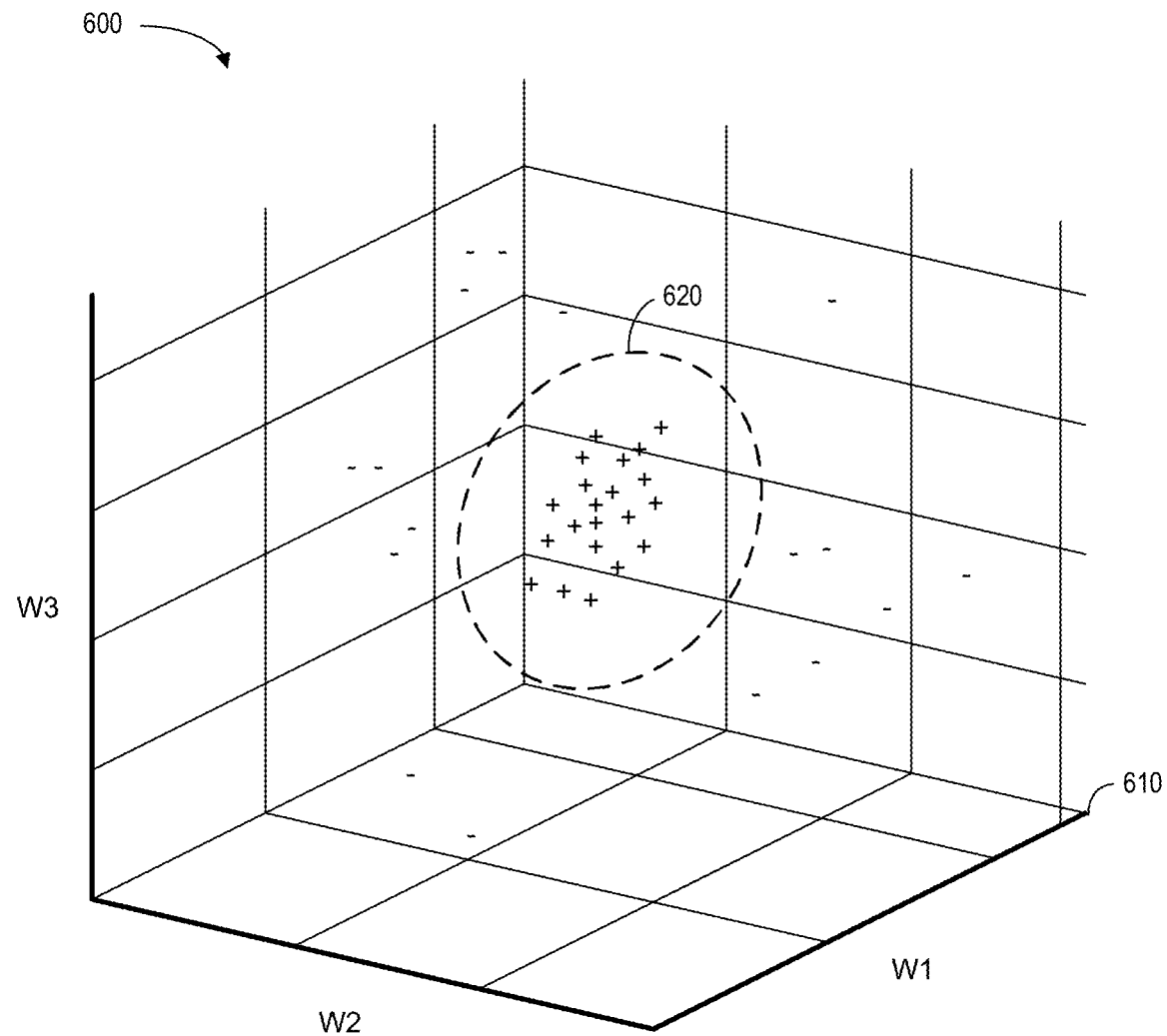

FIGS. 5 and 6 illustrate features, feature vectors, and decision boundaries in accordance with some embodiments. In particular, FIG. 5 illustrates 500 boundaries and feature vectors for a monitoring node parameter in accordance with some embodiments. A graph 510 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 510 illustrated in FIG. 5 represents compressor discharge temperature for a gas turbine but other values might be monitored instead (e.g., compressor pressure ratio, compressor inlet temperature, fuel flow, generator power, gas turbine exhaust temperature, etc.). The graph 510 includes an average boundary 512 (solid line), a minimum boundary 514 (dotted line), a maximum boundary 516 (dashed line), and an indication associated with current feature location for the monitoring node parameter (illustrated with an "X" on the graph 510). As illustrated in FIG. 5, the current monitoring node location is between the minimum and maximum boundaries (that is, the "X" is between the dotted and dashed lines). As a result, the system may determine that the operation of the industrial asset is normal (and no attack or fault is being detected for that monitoring node). FIG. 6 illustrates 600 three dimensions of threat node outputs in accordance with some embodiments. In particular, a graph 610 plots monitoring node outputs during normal operation ("+") and when under attack or experiencing a fault ("−") in three dimensions, such as dimensions associated with PCA: w1, w2, and w3. Moreover, the graph 610 includes a dashed line indication of a normal operating space decision boundary 620.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or other machine based supervised learning techniques) may be used to generate decision boundaries. Since boundaries may be driven by measured data, defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Figure 7:
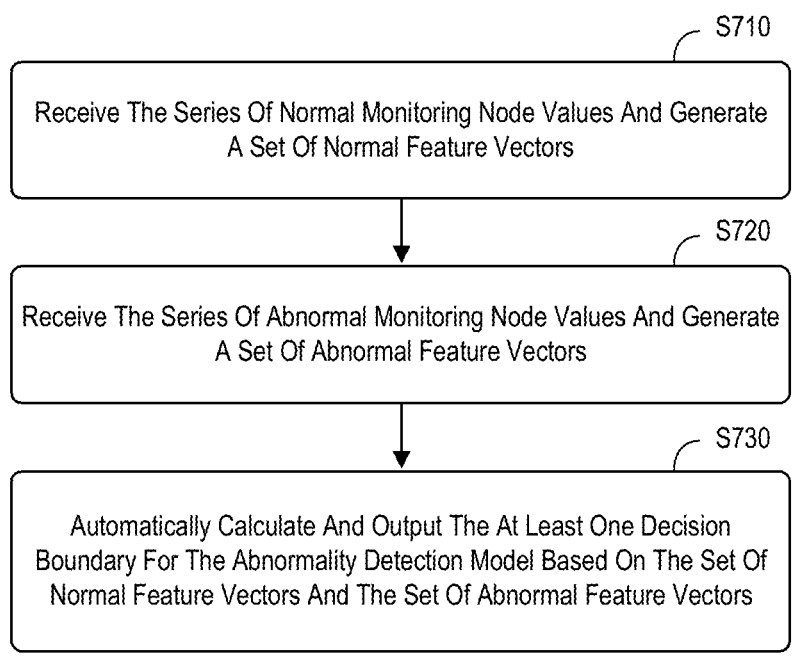
FIG. 7 is an abnormality detection model creation method according to some embodiments.

FIG. 7 illustrates a model creation method that might be performed by some or all of the elements of the system 100, 300 described with respect to FIGS. 1 and 3. At S710, the system may receive, for each of a plurality of monitoring nodes, a series of normal values over time that represent normal operation of the industrial asset and a set of normal feature vectors may be generated. At S720, the system may retrieve, for each of the plurality of monitoring nodes, a series of abnormal values over time that represent abnormal operation of the industrial asset and a set of abnormal feature vectors may be generated. The series of normal values might be obtained, for example, by DoE on an industrial control system associated with a power turbine, a jet engine, a locomotive, an autonomous vehicle, etc. At S730, a decision boundary may be automatically calculated and output for an abnormality detection model based on the sets of normal and abnormal feature vectors. According to some embodiments, the decision boundary might be associated with a line, a hyperplane, a non-linear boundary separating normal space from attacked space, and/or a plurality of decision boundaries. In addition, note that the abnormality detection model might be associated with the decision boundary, feature mapping functions, and/or feature parameters.

Thus, a system may classify the status of an industrial control system having a plurality of monitoring nodes (including sensor, actuator, and controller nodes) as being normal or abnormal. This may enable tailored, resilient, and fault-tolerant control remedies, including the deployment of virtual sensors, against cyber-attacks and faults.

According to some embodiments, time-series data may be received from a collection of monitoring nodes (e.g., sensor, actuator, and/or controller nodes). Features may then be extracted from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node, might be optimized using domain-knowledge, feature engineering, or ROC statistics. The local features for each monitoring node may be stacked to create the global feature vector. The global feature vector may also contain interactive feature involving two or more monitoring nodes, e.g. cross-correlation between two nodes. According to some embodiments, the features may be normalized and the dimension of the global feature vector can then be further reduced using any dimensionality reduction technique such as PCA. Note that the features may be calculated over a sliding window of the signal time series and the length of the window (and the duration of the slide) may be determined from domain knowledge and inspection of the data or using batch processing.

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Note that PCA information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, the output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, the weight may be found using the following equation (assuming that the basis sets are orthogonal):

$$w_j = (S - S_0)^T \Psi_j$$

Note that weights may be an example of features used in a feature vector.

Thus, once the observed quantities from monitoring nodes are expressed in terms of feature vectors (e.g., with many features), the feature vectors may then be used as points in a multi-dimensional feature space. During real-time abnormality detection, decisions may be made by comparing where each point falls with respect to a decision boundary that separates the space between two regions (or spaces): abnormal ("attack" or "fault") space and normal operating space. If the point falls in the abnormal space, the industrial asset is undergoing an abnormal operation such as during a cyber-attack. If the point falls in the normal operating space, the industrial asset is not undergoing an abnormal operation such as during a cyber-attack or fault. In some embodiments, an appropriate decision zone with boundaries is constructed using data sets as described herein with high fidelity models. For example, support vector machines may be used with a kernel function to construct a decision boundary. According to some embodiments, deep learning techniques may be used to construct decision boundaries.

Note that industrial processes may be controlled by Programmable Logic Controllers ("PLC") with Ethernet ports and IP addresses. Computer worms can live in the PLC and be inactive for many days and can replicate itself into many targets as it finds them. IT and OT protection mechanisms cannot completely keep a PLC safe and different approaches may be needed to protect critical infrastructures from more advanced viruses and allow for an industrial asset to operate (including critical functions) even when being attacked. In particular some embodiments described herein provide a multi-node virtual sensor to sustain operation of an industrial asset with no loss of critical function. The virtual sensor might utilize, for example, some or all of the following information to estimate true signals: (1) information from localization about which nodes were attacked independently, (2) features from monitoring nodes, and (3) a multi-node feature-based virtual sensor model trained a priori from the system data set. Estimated true signals may then be used in the respective nodes instead of attacked signals.

In a control system during operational normalcy, the system may receive time series signals from various monitoring nodes (i.e., sensor, actuator, controller, etc.). Consider a general system (e.g., cyber physical system, software system, bio-mechanical system, network system, communication system, etc.) that contains access to continuous streams of data in the form of time series signals from all these sensors. The time series signals might be generated from a set of output sensor nodes ("y"; both physical and virtual sensors already incorporated in the system), a set of actuator nodes ("u"; both hard and soft actuators generated from open or closed loop system), a set of output of controller nodes ("c"; controller node signals), and a set of reference nodes ("r"; reference signals). According to some embodiments, logicals are also considered as time series signals. Some or all combinations of these signals may be used for the purpose of accommodation with a virtual sensor. The virtual sensor matrix used for this purpose may, for example, estimate not only system sensor outputs, y, when an attack takes place to any of the sensor nodes, but also other signals to the control system; actuator node signals, u, controller node signals, c, reference signals, r, etc. Thus, the virtual sensor based accommodation system may provide an intelligent system that is designed to estimate signals that are corrupted/attacked from the healthy signals it receives.

Some embodiments described herein may provide a system and method for autonomous reconfigurable virtual sensing to neutralize the effect of anomalies (cyber-attack or faults) in system measurements. The system may provide correct estimates of compromised sensor measurements using uncompromised sensor measurements, thus replacing the comprised sensors with healthy virtual (or "soft") sensors. The virtual sensing estimator may use, according to some embodiments, continuous adaptive learning. For example, virtual sensor estimations may be computed on-line (during operation of the industrial asset) using an adaptive recursive method based on reinforcement learning. The system may be scalable, efficient, and automatically adjust its configuration to accommodate the time-varying uncompromised portion of the system sensors. Note that the system might work with partial, or no, a priori knowledge (e.g., a predetermined virtual sensor model).

Some embodiments described herein may provide a resilient estimation method for sensors of a control system to maintain the integrity and availability of the system under abnormalities such as cyber-attacks and sensor faults/failures. According to some embodiments, a virtual sensing system may satisfy some or all of the following four criteria:
1. the virtual estimator is unbiased (i.e., zero-mean error);
2. the virtual estimator has white innovation (optimal in the sense of a Cramer-Rao information bound);
3. the virtual estimator is statistically efficient (i.e., the error asymptotically converging to zero); and
4. the estimation error standard division is comparable to the real sensor measurement (so the quality of the virtual estimations is comparable with the physical sensor measurement).

Note that a system may receive time-series data from a collection of sensor monitoring nodes and replace independently attacked/faulty sensor(s) with their virtual estimate(s) as soon as an abnormality is detected. For each compromised sensor, the system may construct a virtual sensing estimator using uncompromised sensors. Each of such virtual sensing estimators can use all (or a subset) of the remaining healthy sensors. For example, for each sensor, an Analysis Of Variance ("ANOVA") or correlation/regression analysis may be performed to rank the contributing factors. The system may then down-select the significant sensors, which are desirable for virtual modeling of each particular on-line sensor estimator. Then, using the aforementioned ANOVA or correlation analysis, the list of the factors to be used in each virtual model may pre-stored into the system, while the virtual sensing model is learnt and adapted online.

Figure 8:
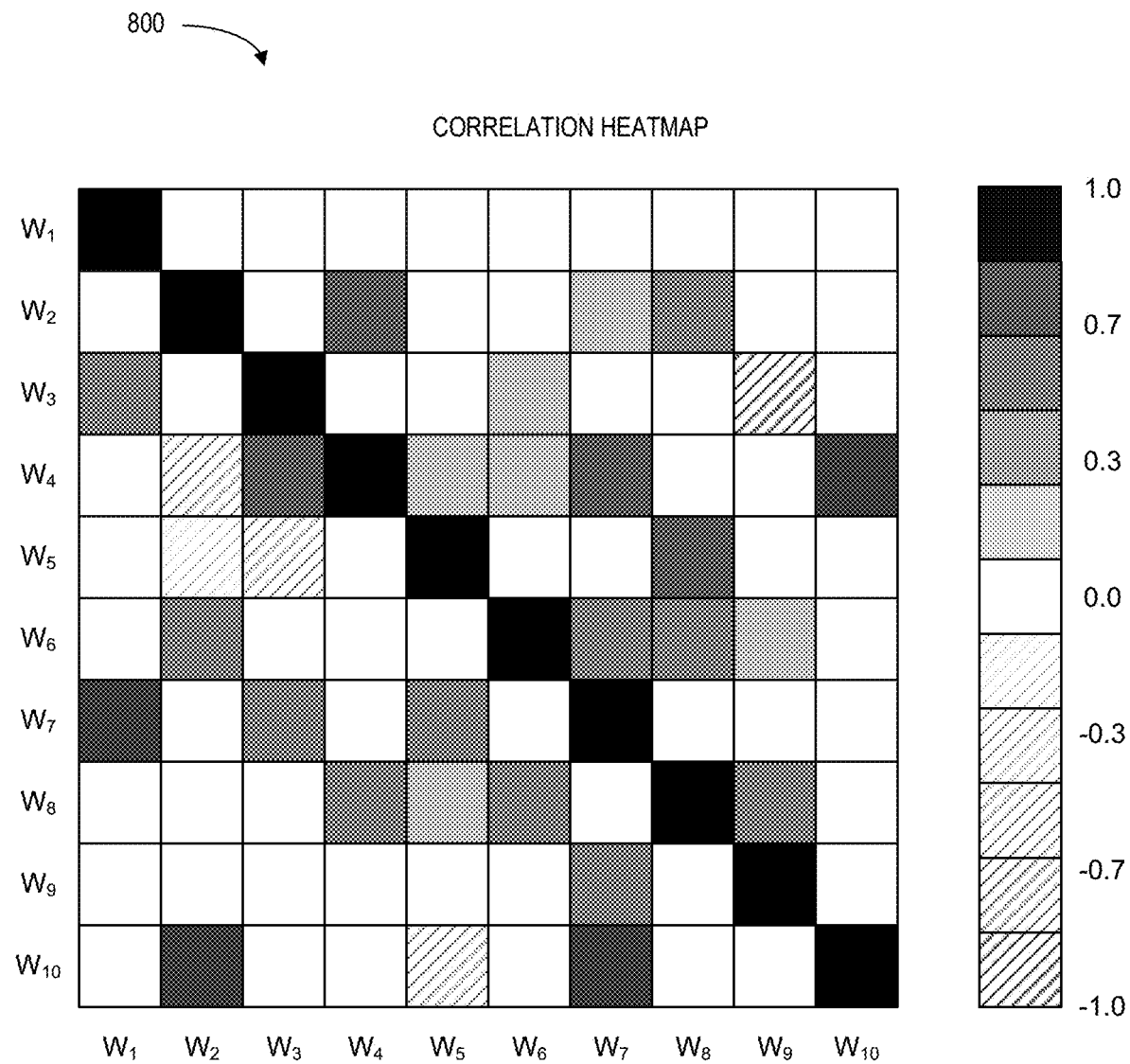
FIG. 8 is a correlation heat map of monitoring nodes in accordance with some embodiments.

For example, FIG. 8 shows a correlation heat map 800 for ten monitoring nodes (sensors/actuators/controller nodes) of a gas turbine. Pairs of values may each have a correlation scores (e.g., from 1 indicating a strong correlation to zero indicating no correlation to −1 indicating a strong negative correlation). For each node, the other nodes whose absolute value of the correlation coefficient is larger than a threshold (e.g., above 0.25) might be stored as main contributing factors. For the critical sensors of the system, or the ones that measure highly nonlinear dynamic phenomena, an off-line model could be learned and then adapted online. For the rest of the sensors, the on-line learning may start completely model-free and the models may be learned from scratch, in real-time during operation of the industrial asset. Note that a virtual sensor may utilize a lookup table, such as the table 900 illustrated in FIG. 9 including a virtual sensor matrix 910 and a signal being estimated 920, to create a value $Y_i = C_{i,j} X_i$ (where i represents the signals in feature space being estimated and j represents the number of attacked signals being estimated).

Some embodiments described herein may assume that when the attacked/faulty sensors are removed, the compromised plant remains observable. The continuous learning may be based on reinforcement learning methodology. For example, an online learning algorithm such as Q-learning or the recursive least-squares method might be used for reinforcement learning. According to some embodiments, the approach might be interpreted as a Partially Observed Markov Decision Process ("POMDP") with continuous state and action spaces. This POMDP may exhibit, for example, deterministic transitions when configuration transitions are specified by a sensor diagnostics and anomaly classification module. A reinforcement learning engine can work on a deep neural network using Q-learning thus comprising a deep Q-network.

During normal operation, all sensors go into a reinforcement learning network running an online learning algorithm (e.g., a recursive least-square, a recursive weighted least square, Q-learning, etc.). This may comprise a "base" configuration of the system. The base configuration remains in place as long as there are no reported abnormalities (i.e., attacks or faults). Once an abnormality is reported, the virtual sensing system automatically adopts into a "partial" configuration for which the healthy sensors are the inputs and the estimates of both the compromised sensors as well normal sensors are the outputs. According to some embodiments, the system may keep the healthy sensors in the estimation loop (i.e., forming a full-order observer) so that at each instant a learnt model for virtual estimations of all sensors is readily available. In this way, if another sensor is suddenly compromised, the system will keep running without facing discontinuity in the underlying optimization procedures of continuous learning. Inside the partial configuration, all or a subset of inputs may be used to compute each particular output. The virtual sensor estimator may be a full-order observer both during the base and partial configurations, hence providing estimates of the measurements of the sensors at all times. The correlation analysis previously described may be used to provide initial guess for the reward/penalty weighting functions in the reinforcement learning.

The continuous learning described herein may serve as a core of a model-free (or partial-model) Kalman filter, which receives partial or full measurements (depending of the status of the system) and provide full-order (or reduced-order) output estimates. A Kalman Temporal Differences technique may be used to implement the Kalman Filter. The described reinforcement learning based continuous learning framework may satisfies the conditions 1 through 4 previously mentioned as long as the plant remains observable through usage of the uncompromised subset of sensors. If the plant loses this observability due to large number of sensors being compromised, the system may still provide virtual sensor estimates but some or all of the conditions may no longer be satisfied. According to some embodiments, an online observability test may be performed using the models built online and a warning may be generated by the virtual sensing estimator in this situation. In addition, statistical tests (such as $X^2$ test) may be performed online using the innovation signal of the uncompromised sensor measurements, which are readily available verses their virtual estimates, which are part of the virtual estimator outputs.

Figure 10A:
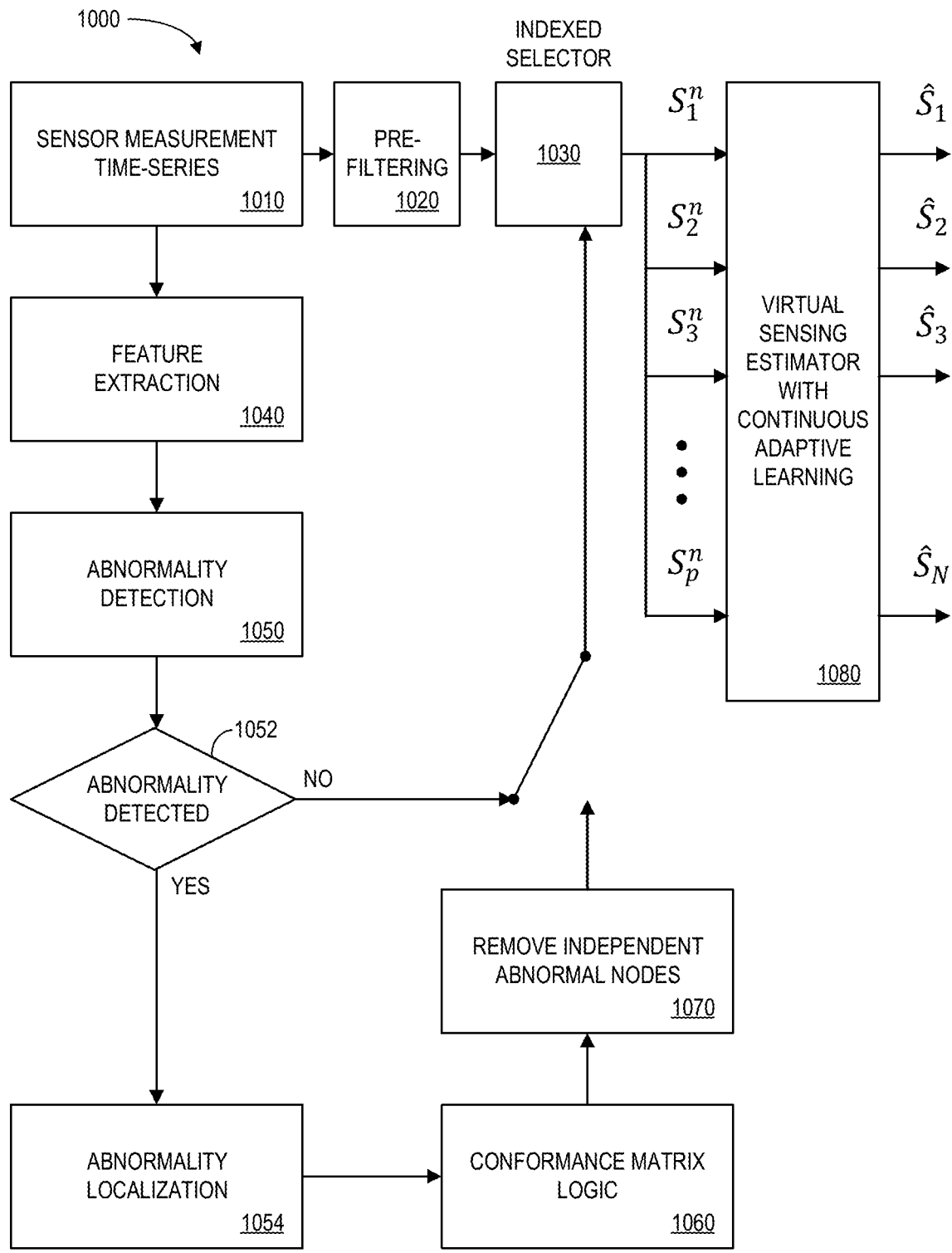
FIG. 10A is an autonomous reconfigurable virtual sensing system architecture according to some embodiments.

FIG. 10A shows an architecture for an autonomous reconfigurable virtual sensing system 1000. The system 1000 receives time-series measurements 1010 of the sensors as inputs. The measurements are pre-filtered 1020 for denoising and outlier removal. Denoising may be done, for example, by low pass filtering using law pass filters whose individual cut-off frequencies may be turned based on the individual bandwidths of each sensor. Outlier removal might be performed online by computing the standard deviation of measurements over a sliding window. For example, FIG. 10B illustrates a sliding window 1090 including a series of values per second. Referring again to FIG. 10A, feature extraction 1040, anomaly detection 1050, and localization techniques 1054 may be used to determine 1052 if there is any anomaly in the sensor (and to specify the particular anomalies). When an anomaly or abnormality exists in the system 1000, all the sensor measurements may be passed, via an indexed selector 1030, to a virtual sensing estimator 1080 that uses an online continuous learning technique in accordance with any of the embodiments described herein. When there is an abnormality, the sensors that are determined by conformance matrix logic 1060 as an independent anomaly (i.e., and not an artifact of the propagation of other anomalies through the system 1000) are removed 1070 and the uncomplimented subset of sensors are passed to the virtual sensing estimator 1080. For example, the system 1000 may have N sensors, of which p sensors are normal and q sensors are independently abnormal. Note that both p and q are time-varying but p[k]+q[k]=N at each time instant k. The p normal sensors are specified by the conformance matrix logic 1060 and down-selected via the indexed selector 1030 to be inputted to the virtual sensing estimator 1080. Note that the normal subset may be continuously changing and, as a result, the internal learning configuration of the virtual sensing estimator 1080 is also changing. The online continuous learning is used to learn a (potentially) nonlinear, time-varying, and variable-structure function $f$ that relates the next-step values of the sensors estimates to the current and lagged values of the sensor estimates (i.e., outputs of the virtual sensing estimator) and the current and lagged values of the normal sensor measurement (i.e., inputs of the virtual sensing estimator) as follows:

$$\hat{S}=[\hat{S}_1 \hat{S}_2 \ldots \hat{S}_N]^T$$

$$\hat{S}^n=[\hat{S}_1{}^n \hat{S}_2{}^n \ldots \hat{S}_p{}^n]^T, \hat{S}^a=[\hat{S}_1{}^a \hat{S}_2{}^a \ldots \hat{S}_q{}^a]^T$$

$$\hat{S}[K+1]=f(\hat{S}[k], \ldots, \hat{S}[k-l], \hat{S}^n[k], \ldots, [k-m], k)$$

where l and m are the number of lags used for outputs and inputs, respectively; and the normal and abnormal sensors are depicted with superscripts, n and a, respectively. Note that both l and m might also be found automatically online and they might be time varying as well, hence making $f$ a variable structure. For substantially large-scale systems, a sparsity structure might be exploited in the virtual sensing estimator 1080 to have a reduced-order observer, or to have a full order observer in which continuous learning computations may applied at each configuration change event until convergence is achieved. Estimator parameters may then remain constant until the next configuration change occurs.

Figure 11:
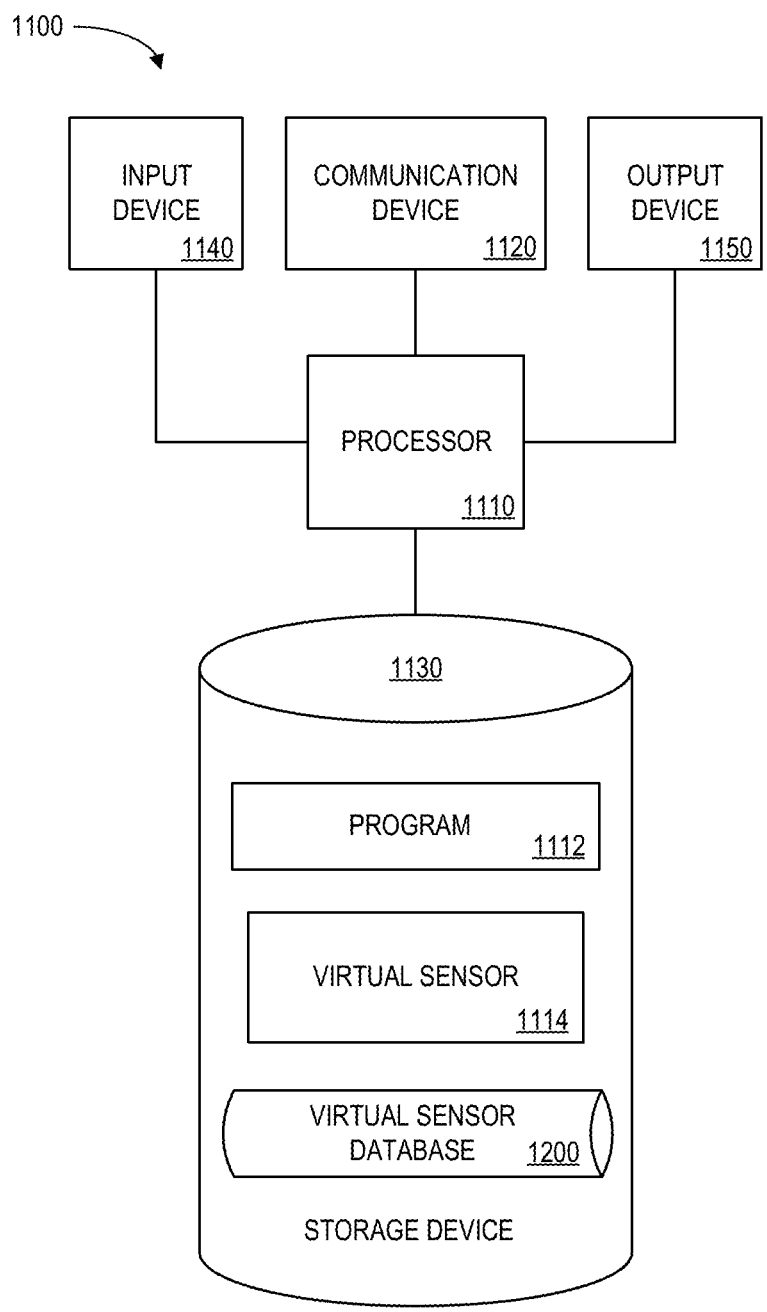
FIG. 11 is a block diagram of an industrial asset protection platform according to some embodiments of the present invention.

The embodiments described herein may be implemented using any number of different hardware configurations. For example, FIG. 11 is a block diagram of an industrial asset protection platform 1100 that may be, for example, associated with the systems 100, 300, 800, 1000 of FIGS. 1, 3, and 10A respectively. The industrial asset protection platform 1100 comprises a processor 1110, such as one or more commercially available Central Processing Units ("CPUs") in the form of one-chip microprocessors, coupled to a communication device 1160 configured to communicate via a communication network (not shown in FIG. 11). The communication device 1160 may be used to communicate, for example, with one or more remote monitoring nodes, user platforms, digital twins, etc. The industrial asset protection platform 1100 further includes an input device 1140 (e.g., a computer mouse and/or keyboard to input virtual sensor and/or predictive modeling information) and/an output device 1150 (e.g., a computer monitor to render a display, provide alerts, transmit recommendations, and/or create reports). According to some embodiments, a mobile device, monitoring physical system, and/or PC may be used to exchange information with the industrial asset protection platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a virtual sensor model 1114 for controlling the processor 1110. The processor 1110 performs instructions of the programs 1112, 1114, and thereby operates in accordance with any of the embodiments described herein. For example, the processor 1110 may determine that at least one abnormal monitoring node is currently being attacked or experiencing a fault. The processor 1110 may also continuously execute an adaptive learning process to create or update virtual sensor models for the monitoring nodes. Responsive to an indication that a monitoring node is currently being attacked or experiencing a fault, the processor 1110 may be dynamically reconfigured to estimate a series of virtual node values for the abnormal monitoring node or nodes based on information from normal monitoring nodes and appropriate virtual sensor models. The series of monitoring node values from the abnormal monitoring node or nodes may then be replaced with the virtual node values The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the industrial asset protection platform 1100 from another device; or (ii) a software application or module within the industrial asset protection platform 1100 from another software application, module, or any other source.

In some embodiments (such as the one shown in FIG. 11), the storage device 1130 further stores a virtual sensor database 1200. An example of a database that may be used in connection with the industrial asset protection platform 1100 will now be described in detail with respect to FIG. 12. Note that the database described herein is only one example, and additional and/or different information may be stored therein. Moreover, various databases might be split or combined in accordance with any of the embodiments described herein.

Referring to FIG. 12, a table is shown that represents the virtual sensor database 1200 that may be stored at the industrial asset protection platform 1100 according to some embodiments. The table may include, for example, entries identifying industrial assets to be protected. The table may also define fields 1202, 1204, 1206, 1208, 1210, 1212 for each of the entries. The fields 1202, 1204, 1206, 1208, 1210, 1212 may, according to some embodiments, specify: an industrial asset identifier 1202, an industrial asset description 1204, a virtual sensor identifier 1206, a matrix 1208, description 1210, and a status 1212. The virtual sensor database 1200 may be created and updated, for example, when a new physical system is monitored or modeled, an attack is detected, etc.

Figure 13:
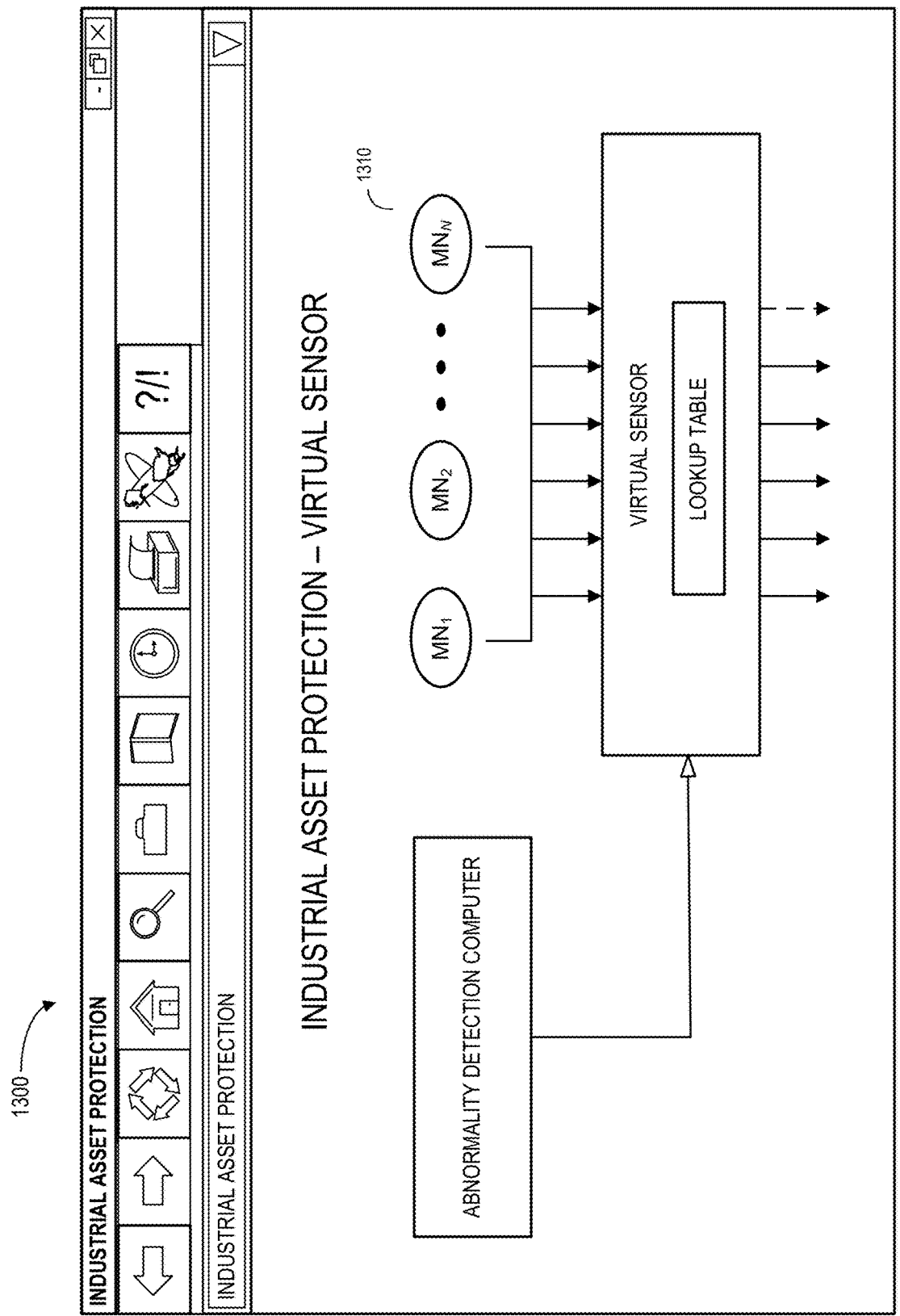
FIG. 13 is a virtual sensor display according to some embodiments.

The industrial asset identifier 1202 and description 1204 may define a particular machine or system that will be protected. The virtual sensor identifier 1206 might be a unique alphanumeric code identifying a particular sensor being modeled for the industrial asset. The matrix 1208 might be associated with a correlation heat map or lookup table, the description 1210 might indicate what sensor is being estimated, and the status 1212 might indicate, for example, whether the associated monitoring node is operating normally or is currently undergoing a cyber-attack, experience a fault, and/or is being replaced (e.g., with a "predicted" value"). FIG. 13 is an example of a virtual sensor display 1300 that might be used, for example, to provide information 1310 to an operator and/or to provide an interactive interface allowing an operator to adjust virtual sensors as appropriate.

Figure 14:
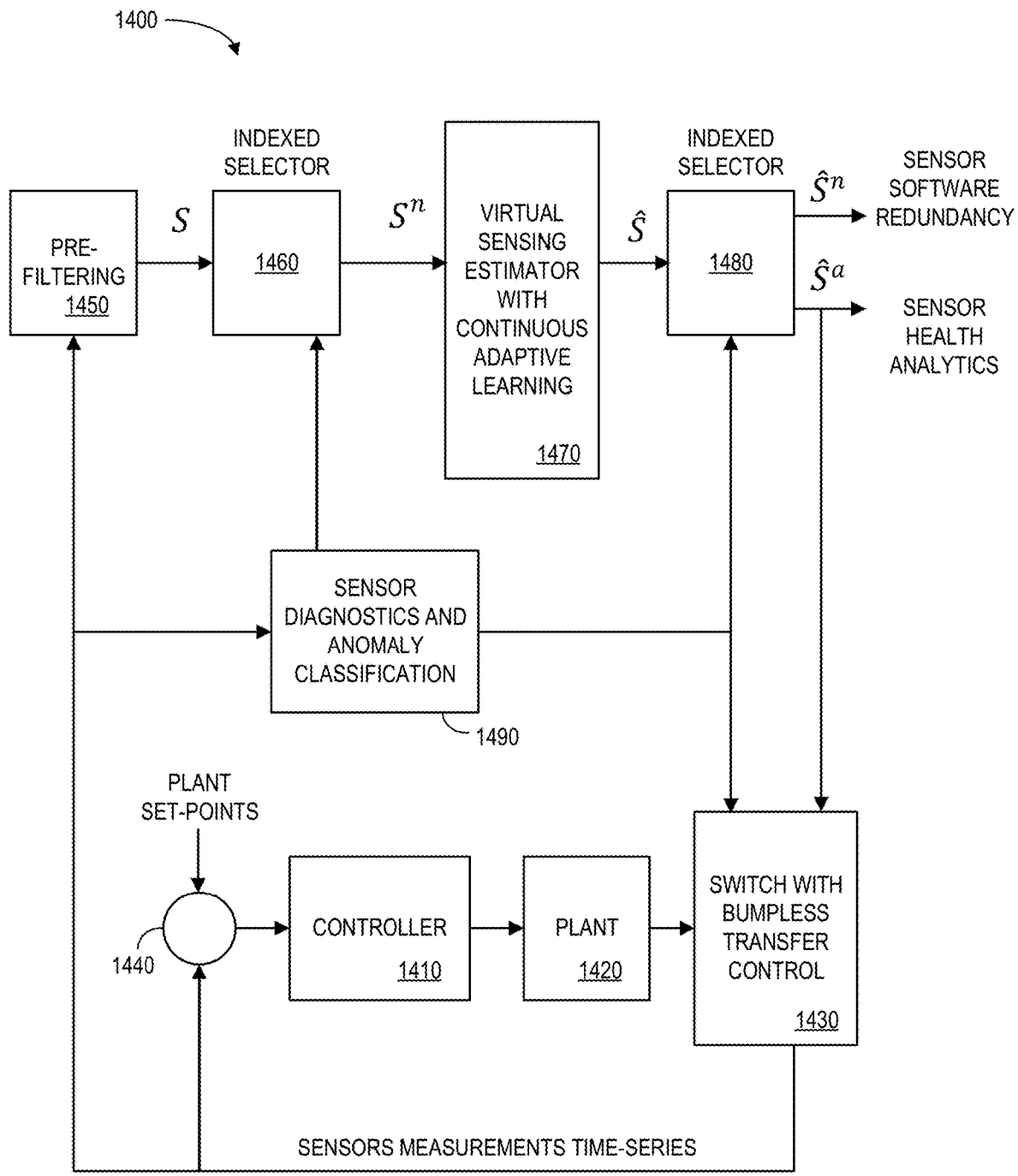
FIG. 14 is an autonomous reconfigurable virtual sensing system in accordance with some embodiments.

FIG. 14 shows a system 1400 that uses a virtual sensing estimator 1470 in a controls and analytics platform. In particular, sensor measurement time-series values are combined 1440 with plant set-points and the result goes to a switch with bumpless transfer control 1430 via a controller 1410 and a plant 1420. The sensors measurements time-series values also under go pre-filtering 1450 before being passed to the virtual sensing estimator via a first indexed selector 1460. A second indexed selector 1480, controlled by sensor diagnostics and anomaly classification 1490 receives data from the virtual sensing estimator 1470 and provides information for sensor software redundancy, sensor health analysis, and control of the switch 1430.

The healthy estimates of the abnormal sensors and their indices are the provided into the control loop and are used to replace of the original abnormal measurements. This is done through the switch with bumpless transfer control 1430 that might utilize any bumpless switching mechanism (such as a bumpless Proportional-Integral-Derivative ("PID"), a switched adaptive controller, a smooth transition controller, etc.). During normal operation, the switch 1430 is open and thus the plant sensor measurements are passed through the feedback loop.

When an anomaly is detected, the switch 1430 is closed and the virtual healthy estimated of the abnormal sensors are passed to the control feedback loop. The bumpless transfer control may help ensure smoothness of the signals during a transition and avoids abrupt (and potentially destabilizing) spikes in the control loop. The sensor measurement time-series may be a combination of the virtual sensor estimates (replacing the independently compromised sensors) and the original plant sensors that are not independently compromised. This mechanism may help neutralize the effect of the abnormal measurements (which could be due the abnormality of the sensor itself, such as a sensor fault, or a cyber-attack on the sensor) and maintains healthy operations of the plant. Note that the switch 1430 can be re-opened as soon as the plant status is back to normal (again with bumpless transfer control) or may remain latched in for some additional period time and opened after that delay. According to some embodiments, the estimates of the abnormal measurement are also used for further health analytics. The system 1400 may also produce estimates of healthy measurements in real-time. These estimates may remain in "stand-by" and when any of those sensors becomes abnormal the 1400 system can adopt a new configuration. According to some embodiments, these estimates also provide software redundancy to increase the reliability of plant operations.

Thus, a virtual sensing system may get a portion of the sensor measurements that are healthy and uncompromised and then use that information to provide healthy estimations for the measurements of sensors that are compromised. Since the compromised/uncompromised portions of measurements can be any subset of the system sensors, a substantial number of estimation models may need to be developed and stored, resulting in a long development time. This is a brute force approach might build a model as a look-up table of parameters for each sensor, using least squares regression or other parameter estimation techniques offline, and then save all models in the system. It addition to being a large development effort, this approach may require substantial amounts of memory and computational power. In contrast, some embodiments described herein introduce a variable-structure that autonomously reconfigures based on sensors status and provides an online estimation using models that are built adaptively on-the-fly. Some advantages of the present invention may include: replacing faulty/attacked sensors with corrected estimates to provide a resilient estimation for attack neutralization; potentially eliminating some sensors to reduce cost (e.g., in a gas turbine low-speed shaft speed ("TNL") and high-speed shaft speed ("TNH") might be replaced with virtual sensing); a surrogate back up for critical and/or unreliable sensors (such as TTXM) may be provided; and/or improved control performance by having more sensors available—including those that are difficult or expensive to directly measure. Other advantages of the present invention may include: reduced asset down-time due to cyber incents and faults; increases asset reliability and availability by providing software and algorithmic redundancy; and reduced sensor cost (sensors might be permitted to be less reliable or even eliminated entirely).

Thus, embodiments may improve cyber security and accommodate critical functionality associated with an industrial asset. Moreover, embodiments may by-pass signals from attacked sensors using estimated signals created using data from healthy sensors just before the attack took place. This approach may allow for a correction mechanism to sustain the operations while alerting the operators about the cyber-attack. Increasing machine intelligence through multi-node feature-based virtual sensors may provide cyber-safe operations because of its abilities to estimate multiple attacked nodes simultaneously from an extremely large number of healthy nodes. A properly designed system, linking all critical nodes can provide increased resilience to attacks. Moreover, embodiments may result in an ability to install fewer redundant sensors due to the highly accurate virtual sensors described herein.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, military devices, etc.

According to some embodiments, a virtual sensor model may be created (e.g., via an adaptive learning process) to replace a corresponding sensor monitoring node when needed. According to other embodiments, similar approaches may be taken with respect to other types of monitoring nodes. For example, a virtual model might replace an actuator monitoring node or a controller monitoring node that is currently experiencing an abnormality.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
   a plurality of monitoring nodes, each monitoring node generating a series of monitoring node values over time that represent a current operation of the industrial asset;
   an abnormality detection computer to determine that at least one abnormal monitoring node is currently being attacked or experiencing a fault; and
   a processor configured to access program instruction, the program instruction causing the processor to implement a virtual sensing estimator,
   the virtual sensing estimator coupled to the plurality of monitoring nodes and the abnormality detection computer, to:
   (i) continuously execute an adaptive learning process to create or update virtual sensor models for the monitoring nodes, the updated virtual sensor models being updated versions of a correlation heat map based on off-line training,
   (ii) responsive to an indication that the at least one abnormal monitoring node is currently being attacked or experiencing a fault, dynamically reconfigure the virtual sensing estimator configured to estimate a series of virtual node values for the abnormal monitoring node or nodes based on information from normal monitoring nodes and appropriate virtual sensor models, and
   (iii) replace the series of monitoring node values from the abnormal monitoring node or nodes with the virtual node values.

2. The system of claim 1, wherein the adaptive learning process is associated with a reinforcement learning network.

3. The system of claim 2, wherein the reinforcement learning network is associated with at least one of: (i) Q-learning, (ii) a recursive least-squares method, and (iii) recursive weighted least-squares method.

4. The system of claim 1, wherein the virtual sensing estimator is associated with a partially observed Markov decision process with continuous state and action spaces.

5. The system of claim 1, wherein the virtual sensor models are created or updated based on at least one of: (i) an analysis of variance, and (ii) a correlation/regression analysis.

6. The system of claim 1, wherein the dynamic reconfiguration is associated with at least one of: (i) an indexed selector, (ii) bumpless transfer control, and (iii) a proportional-integral-derivative controller, (iv) a switched adaptive control, and (v) a smooth transition controller.

7. The system of claim 1, wherein the virtual sensing estimator configured to estimates the series of virtual node values directly in time space after pre-filtering.

8. The system of claim 7, wherein the pre-filtering includes: (i) de-noising via low pass filtering using low pass filters with individual cut-off frequencies tuned based on individual bandwidths of each monitoring node, and (ii) outlier removal by computing a standard deviation of measurement over a sliding window.

9. The system of claim 1, wherein the virtual sensing estimator: (i) is unbiased with a zero-mean error, (ii) has white Gaussian noise associated with a Cramer-Rao information bound, (iii) statistically efficient with an error asymptotically converging to zero, and (iv) has an estimation error standard division substantially comparable to each monitoring node.

10. The system of claim 1, wherein the virtual sensing estimator configured to further to:
   generate a warning based on an on-line observability test or a statistical test.

11. The system of claim 1, wherein at least one monitoring node is associated with at least one of: (i) a sensor node, (ii) a critical sensor node, (iii) an actuator node, (iv) a controller node, and (v) a key software node.

12. The system of claim 1, wherein the abnormality detection computer subsequently determines that an abnormal monitoring node is no longer currently being attacked or experiencing a fault and, as a result, the virtual sensing estimator configured to stop replacing the series of monitoring node values from the abnormal monitoring node with the virtual node values.

13. The system of claim 1, further comprising;
   a normal space data source storing, for each of the plurality of monitoring nodes, a series of normal monitoring node values over time that represent normal operation of the industrial asset;
   an abnormal space data source storing, for each of the plurality of monitoring nodes, a series of attacked monitoring node values over time that represent abnormal operation of the industrial asset; and
   an abnormality detection model creation computer to:
      (i) receive the series of normal monitoring node values and generate a set of normal feature vectors,
      (ii) receive the series of abnormal monitoring node values and generate a set of abnormal feature vectors, and
      (iii) automatically calculate and output at least one decision boundary for an abnormality detection model based on the set of normal feature vectors and the set of abnormal feature vectors.

14. The system of claim 13, wherein the abnormality detection computer is to:
   (i) receive a series of current monitoring node values and generate a set of current feature vectors,
   (ii) access the abnormality detection model having the at least one decision boundary, and
   (iii) execute the at least one abnormality detection model and transmit an abnormality alert based on the set of current feature vectors and the at least one decision boundary, wherein the abnormality alert indicates whether a monitoring node status is normal or abnormal.

15. The system of claim 14, wherein the set of current feature vectors includes at least one of: (i) a local feature vector associated with a particular monitoring node, and (ii) a global feature vector associated with a plurality of monitoring nodes.

16. The system of claim 1, wherein the industrial asset is associated with at least one of: (i) a turbine, (ii) a gas turbine, (iii) a wind turbine, (iv) an engine, (v) a jet engine, (vi) a locomotive engine, (vii) a refinery, (viii) a power grid, (ix) a dam, and (x) an autonomous vehicle.

17. A computerized method to protect an industrial asset associated with a plurality of monitoring nodes, each monitoring node generating a series of monitoring node values over time that represent current operation of the industrial asset, comprising:
   determining, by an abnormality detection computer, that at least one abnormal monitoring node is currently being attacked or experiencing a fault;
   continuously executing, by a virtual sensing estimator, an adaptive learning process to create or update virtual sensor models for the monitoring nodes, the updated virtual sensor models being updated versions of a correlation heat map based on off-line training;
   responsive to an indication that the at least one abnormal monitoring node is currently being attacked or experiencing a fault, dynamically reconfiguring the virtual sensing estimator to estimate a series of virtual node values for the abnormal monitoring node or nodes based on information from normal monitoring nodes and appropriate virtual sensor models; and
   replacing the series of monitoring node values from the abnormal monitoring node or nodes with the virtual node values.

18. The method of claim 17, wherein the adaptive learning process is associated with a reinforcement learning network and at least one of: (i) Q-learning, (ii) a recursive least-squares method, and (iii) recursive weighted least-squares method.

19. A non-transitory, computer-readable medium storing instructions that, when executed by a computer processor, cause the computer processor to perform a method to protect an industrial asset associated with a plurality of monitoring nodes, each monitoring node generating a series of monitoring node values over time that represent current operation of the industrial asset, the method comprising:
   determining, by an abnormality detection computer, that at least one abnormal monitoring node is currently being attacked or experiencing a fault;
   continuously executing, by a virtual sensing estimator, an adaptive learning process to create or update virtual sensor models for the monitoring nodes, the updated virtual sensor models being updated versions of a correlation heat map based on off-line training;
   responsive to an indication that the at least one abnormal monitoring node is currently being attacked or experiencing a fault, dynamically reconfiguring the virtual sensing estimator to estimate a series of virtual node values for the abnormal monitoring node or nodes based on information from normal monitoring nodes and appropriate virtual sensor models; and
   replacing the series of monitoring node values from the abnormal monitoring node or nodes with the virtual node values.

20. The medium of claim 19, wherein the adaptive learning process is associated with a reinforcement learning network and at least one of: (i) Q-learning, (ii) a recursive least-squares method, and (iii) recursive weighted least-squares method.

* * * * *